(12) United States Patent
Yajima et al.

(10) Patent No.: US 6,315,417 B1
(45) Date of Patent: Nov. 13, 2001

(54) PROJECTOR

(75) Inventors: Akitaka Yajima, Tatuno; Yasunori Ogawa, Suwa; Jiro Ito, Hakusyu, all of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/319,534
(22) PCT Filed: Oct. 9, 1998
(86) PCT No.: PCT/JP98/04569
§ 371 Date: Jun. 8, 1999
§ 102(e) Date: Jun. 8, 1999
(87) PCT Pub. No.: WO99/19759
PCT Pub. Date: Apr. 22, 1999

(30) Foreign Application Priority Data

Oct. 9, 1997 (JP) .................................................... 9-277849

(51) Int. Cl.[7] .................................................. G03B 21/14
(52) U.S. Cl. ........................................... 353/122; 353/38
(58) Field of Search ................................ 353/20, 31, 33, 353/34, 37, 38, 122, 98; 349/5

(56) References Cited

U.S. PATENT DOCUMENTS 5,418,583 * 5/1995 Masumoto .............................. 353/38
5,760,850 * 6/1998 Nakanishi et al. ........................ 349/5
5,777,804 * 7/1998 Nakamura et al. ..................... 353/98
5,909,316 * 6/1999 Watanabe ............................. 359/619
6,000,802 * 12/1999 Hashizume et al. .................... 353/38

FOREIGN PATENT DOCUMENTS 7-49479  2/1995 (JP) .
9-54279  2/1997 (JP) .
9-171150  6/1997 (JP) .

* cited by examiner

Primary Examiner—William Dowling
(74) Attorney, Agent, or Firm—Oliff & Berridge, PLC

(57) ABSTRACT

In a projection display device 1, emergent light from an illumination optical system 80 is diffused by microlenses 101 provided in a liquid crystal light valve 100R. Emergent light from the liquid crystal light valve 100R diffused by these microlenses 101 is efficiently drawn into a projection optical system 60 whose f-number is set to be less than the f-number of the illumination optical system 80. As a result, it is possible to prevent light utilization efficiency from being deteriorated due to light diffusion by the microlenses 101. Consequently, it is possible to obtain a bright projection image in a projection display device in which a liquid crystal light valve having microlenses is incorporated.

14 Claims, 6 Drawing Sheets

PROJECTOR

BACKGROUND OF THE INVENTION

1. Field of the Invention

The present invention relates to a projection display device in which a light beam emitted from a light source is modulated by a light valve using a liquid crystal panel or the like, and the modulated light beam is enlarged and projected via a projection optical system.

2. Description of Related Art

A projection display device has been known in which a light beam emitted from an illumination optical system is converted into a modulated beam corresponding to image information by using a liquid crystal light valve, and the modulated beam is enlarged and projected onto a screen (projection plane) via a projection optical system. FIG. 6 shows an optical system in such a projection display device. As this figure shows, a projection display device 1000 comprises an illumination optical system 80 including a light source 81 and a uniform illumination optical system 82, a liquid crystal light valve 100A to be irradiated with light by the illumination optical system 80, and a projection optical system 60A for enlarging and projecting emergent light from the liquid crystal light valve 100A onto a screen 900.

In the projection display device 1000 having such a conventional configuration, the f-numbers $F_L$ and $F_P$ of the illumination optical system 80 and the projection optical system 60A are designed to be nearly equal to each other.

In general, the projection optical system 60A is frequently represented by a single lens element, as shown in FIG. 6, whereas it is normally composed of a plurality of lens elements. This means that a plurality of lens elements can be replaced by a single lens element having a function equivalent to that of those lens elements. It is assumed that the f-number $F_P$ of the projection optical system refers to the f-number of the single lens element thus replaced, that is to say, a value $1_P/d_P$ that is obtained by dividing a focal distance $1_P$ of the single lens element by a diameter $d_P$ of the lens.

Furthermore, it is assumed that the f-number $F_L$ of the illumination optical system refers to the f-number of a lens element disposed on the most downstream side of the optical path, that is, closest to the liquid crystal light valve 100A, which is an object to be illuminated, among a plurality of lens elements included in the illumination optical system. When the lens element disposed on the most downstream side of the optical path is a lens array composed of a plurality of small lenses, as shown in FIG. 6, the f-number $F_L$ of the illumination optical system does not refer to the f-number of each small lens, but to a value $1_L/d_L$ obtained by dividing a distance $1_L$ from the lens array to an object to be illuminated by the maximum diameter $d_L$ of the lens array (e.g., the diameter in the case of a circular lens array, the length of the diagonal line in the case of a rectangular lens array).

On the other hand, projection display devices have recently been required to display high-definition images. In order to display a high-definition image, it is necessary to increase the number of pixels in a liquid crystal light valve. In a liquid crystal light valve in which pixels are arranged in a matrix, the peripheries of the pixels are shielded from light by a light-shielding layer called a black matrix. Therefore, as the number of pixels in the liquid crystal light valve increases, the region occupied by the black matrix enlarges, and conversely, the area of pixel apertures decreases. That is to say, the amount of light emitted from the liquid crystal light valve decreases as the definition of the liquid crystal light valve increases, and therefore, a projection image produced by the projection display device becomes dark as the definition of an image to be projected increases.

In order to avoid such harmful effects, a liquid crystal light valve has been proposed which is provided with a microlens array composed of a plurality of microlenses so that light is efficiently guided to corresponding pixel apertures by the microlenses.

While incident light can be efficiently guided to the pixel apertures in the liquid crystal light valve provided with the microlens array, emergent light from the liquid crystal light valve, however, is diffused by the lensing action of the microlens array. For this reason, the inclination angle of emergent light from the liquid crystal light valve having microlenses is greater than that of emergent light from a liquid crystal light valve that does not have microlenses.

Therefore, if a liquid crystal light valve having microlenses is incorporated in the conventional projection display device 1000 in which the f-numbers of the illumination optical system 80 and the projection optical system 60A are designed to be nearly equal, there is a fear that a part of emergent light from the liquid crystal light valve will not be drawn into the projection optical system 60A. As a result, light utilization efficiency is lowered, and an image projected on the screen becomes dark.

SUMMARY OF THE INVENTION

In view of the above-described problems, an object of the present invention is to provide a projection display device having a light valve with microlenses incorporated therein, wherein a bright projection image can be obtained by preventing light utilization efficiency from being deteriorated due to light diffusion by the microlenses.

In order to solve the above problems, the present invention provides a projection display device comprising a light valve for modulating a light beam emitted from an illumination optical system, the light valve including pixels arranged in a matrix, and a microlens array having a plurality of microlenses for collecting incident light to the pixels; and a projection optical system for enlarging and projecting the light beam modulated by the light valve, wherein the f-number of the projection optical system is less than the f-number of the illumination optical system.

In the projection display device of the present invention, the f-number of the projection optical system is set to be less than that of the illumination optical system so that emergent light from the liquid crystal light valve diffused by the microlenses is efficiently drawn into the projection optical system. For this reason, it is possible to prevent light utilization efficiency from being deteriorated due to light diffusion by the microlenses, and to obtain a sufficient effect of forming the microlenses in the liquid crystal light valve. That is to say, it is possible to cause a large amount of light guided to pixel apertures by the microlenses to efficiently reach a projection plane, and to obtain a bright projection image in a projection display device in which a liquid crystal light valve having microlenses is incorporated.

In order to make almost all emergent light from the liquid crystal light valve, which is diffused by the microlenses, to be drawn into the projection optical system, the f-number $F_P$ of the projection optical system is set to satisfy the following equation:

$$F_P \leq [\tan\{\tan^{-1}(2 \times F_M) + \tan^{-1}(2 \times F_L) - 90°\}]/2$$

where the F-numbers of the projection optical system, the illumination optical system, and the microlenses are $F_P$, $F_L$, and $F_M$, respectively.

The illumination optical system to be adopted may include a light source, and a uniform illumination optical system for splitting a light beam emitted from the light source into a plurality of partial beams, and superimposing the partial beams onto the light valve. The adoption of such an illumination optical system makes it possible to uniformly illuminate the liquid crystal light valve, and to thereby obtain a high-contrast projection image.

When the illumination optical system to be adopted includes a light source, a first lens plate having a plurality of rectangular lenses for splitting emergent light from the light source into a plurality of intermediate beams, and a second lens plate having a plurality of rectangular lenses for superimposing onto the light valve the plurality of intermediate beams split by the first lens plate, it is also possible to uniformly illuminate the liquid crystal light valve, and to obtain a high-contrast projection image.

In this case, the plurality of rectangular lenses that constitute the second lens plate may be decentering lenses. This allows the plurality of intermediate beams to be superimposed at a shorter distance.

When the illumination optical system to be adopted includes a light source, first and second lens plates having a plurality of rectangular lenses for splitting emergent light from the light source into a plurality of intermediate beams, and a superimposing lens for superimposing onto the light valve the plurality of intermediate beams split by the first and second lens plates, it is also possible to uniformly illuminate the liquid crystal light valve, and to obtain a high-contrast projection image. The superimposing lens allows the plurality of intermediate beams to be superimposed at a shorter distance.

The illumination optical system may include a light source, and a light-collecting lens for collecting emergent light from the light source. When such an illumination optical system is adopted, since diffusion of light from the light source can be prevented by a light collecting function of the light-collecting lens, light utilization efficiency is improved, and a bright projection image can be obtained.

The projection display device may include a color separation optical system for separating a light beam emitted from the illumination optical system into a plurality of color beams, a plurality of above-described light valves for modulating the color beams separated by the color separation optical system, a color synthesizing optical system for synthesizing the color beams modulated by the light valves, and the projection optical system for enlarging and projecting the beams synthesized by the color synthesizing optical system.

DESCRIPTION OF PREFERRED EMBODIMENTS

A projection display device to which the present invention is applied will be described below with reference to the drawings. In the description of an optical system, for convenience, three orthogonal directions are designated X, Y, and Z, and Z indicates the direction of travel of light. The projection display device of this embodiment is of a type that separates a light beam emitted from an illumination optical system into three color beams of red, green, and blue, modulates these color beams through liquid crystal light valves according to image information, synthesizes the modulated color beams, and enlarges and projects the synthesized beams onto a screen via a projection optical system.

A. Configuration of the Device

Figure 1:
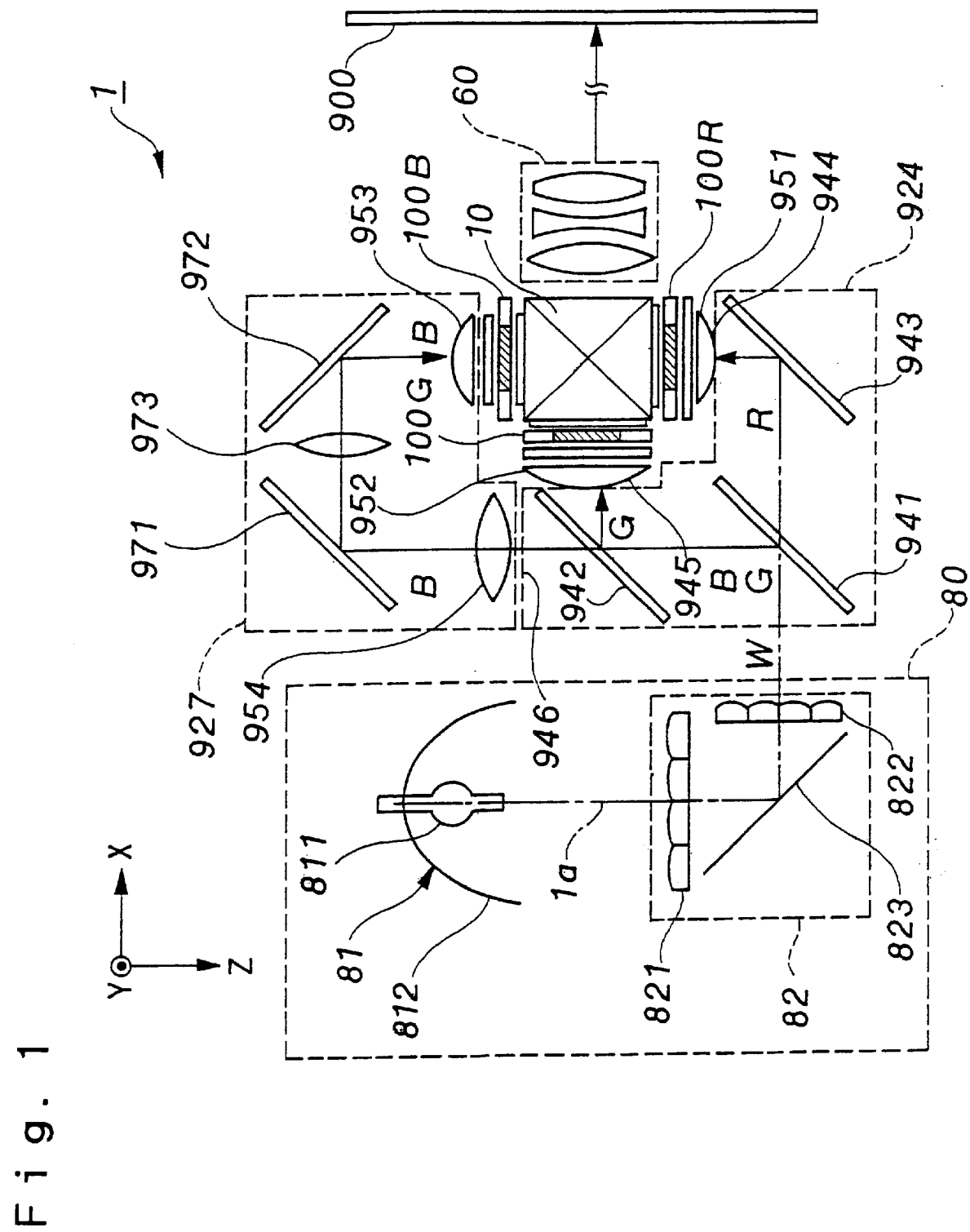
FIG. 1 is a schematic structural view of an optical system in a projection display device to which the present invention is applied.

FIG. 1 schematically shows the configuration of an optical system incorporated in a projection display device 1 of this embodiment. The optical system in the projection display device 1 of this embodiment comprises an illumination optical system 80 having a light source 81, a color separation optical system 924 for separating a light beam W emitted from the illumination optical system 80 into a red beam R, a green beam G, and a blue beam B, three liquid crystal light valves 100R, 100G, and 100B for modulating the color beams R, G, and B, a dichroic prism 10 serving as a color synthesizing system for synthesizing the modulated color beams, a projection optical system 60 for enlarging and projecting the synthesized beams onto the surface of a screen 900, and a light guide system 927 for guiding the blue beam B of the color beams R, G, and B to the corresponding liquid crystal light valve 100B.

The illumination optical system 80 comprises the light source 81, and a uniform illumination optical system 82 for splitting a light beam from the light source 81 into a plurality of partial beams, and superimposing those partial beams onto the liquid crystal light valves 100R, 100G, and 100B.

The light source 81 includes a light-source lamp 811, such as a halogen lamp, a metal halide lamp, or a xenon lamp, and a reflector 812 for emitting emergent light from the light-source lamp 811 as nearly parallel light. As the reflector 812, a reflector having a reflecting surface, whose shape is parabolic, elliptic, or the like, is used.

The uniform illumination optical system 82 includes a first lens plate 821 and a second lens plate 822 that have a plurality of rectangular lenses. The uniform illumination optical system 82 also includes a reflecting mirror 823 so as to perpendicularly bend an optical axis 1a of emergent light from the first lens plate 821 toward the front of the device. The first and second lens plates 821 and 822 are arranged so as to be at right angles to each other across the reflecting mirror 823.

Emergent light from the light source 81 is split into a plurality of intermediate beams by the rectangular lenses that constitute the first lens plate 821, and superimposed onto the liquid crystal light valves 100R, 100G, and 100B via the rectangular lenses that constitute the second lens plate 822. In this way, since the liquid crystal light valves 100R, 100G, and 100B are illuminated using the uniform illumination optical system 82 in the projection display device 1 of this embodiment, they can be irradiated with uniform illumination light, which is effective in obtaining a high-contrast projection image.

The color separation optical system 924 includes a blue and green reflecting dichroic mirror 941, a green reflecting dichroic mirror 942, and a reflecting mirror 943. First, a blue beam B and a green beam G contained in a light beam W are reflected nearly perpendicularly by the blue and green reflecting dichroic mirror 941, and travel toward the green reflecting dichroic mirror 942.

A red beam R passes through this blue and green reflecting dichroic mirror 941, is reflected nearly perpendicularly by the reflecting mirror 943 disposed behind, and is emitted from an emergent portion 944 for the red beam R toward the dichroic prism 10. Next, only the green beam G of the blue and green beams B and G, which have been reflected by the blue and green reflecting dichroic mirror 941, is reflected nearly perpendicularly by the green reflecting dichroic mirror 942, and is emitted from an emergent portion 945 for the green beam G toward the dichroic prism 10. The blue beam B passed through the green reflecting dichroic mirror 942 is emitted from an emergent portion 946 for the blue beam B toward the light guide system 927. In this embodiment, the distances from an emergent portion of the illumination optical system 80 for the light beam W to the emergent portions 944, 945, and 946 of the color separation optical system 924 for the color beams are set to be substantially equal.

On the emergent sides of the emergent portions 944 and 945 of the color separation optical system 924 for the red beam R and the green beam G, light-collecting lenses 951 and 952 are disposed, respectively. Therefore, the red beam R and the green beam G emerging from the emergent portions 944 and 945 enter these light-collecting lenses 951 and 952, where they are collimated.

The red beam R and the green beam G thus collimated enter the liquid crystal light valves 100R and 100G, where they are modulated and given corresponding image information. That is to say, these liquid crystal light valves are subjected to switching control by a driving means, which is not shown, according to image information, and thereby, the color beams passing therethrough are modulated. As such a driving means, a known means can be used unaltered. In contrast, the blue beam B is guided to the corresponding liquid crystal light valve 100B via the light guide system 927, where it is similarly modulated according to image information.

The light guide system 927 comprises a light-collecting lens 954 disposed on the emergent side of the emergent portion 946 for the blue beam B, an incident-side reflecting mirror 971, an emergent-side reflecting mirror 972, an intermediate lens 973 interposed between these reflecting mirrors, and a light-collecting lens 953 disposed in front of the liquid crystal light valve 100B. The blue beam B has the longest one of the optical path lengths of the color beams, that is, the distances from the light source 81 to the liquid crystal light valves. Therefore, this light beam undergoes the largest light loss. The light loss can, however, be reduced by interposing the light guide system 927.

The color beams R, G, and B modulated through the liquid crystal light valves 100R, 100G, and 100B enter the dichroic prism 10, where they are synthesized. In the dichroic prism 10, dichroic layers are formed in the shape of an X along bonded surfaces between four right-angle prisms. A color image synthesized by the dichroic prism 10 is enlarged and projected onto the surface of the screen 900 at a predetermined position via the projection optical system 60 that is a constituent of a projection lens unit. As the projection optical system 60, a telecentric lens may be used.

Figure 2:
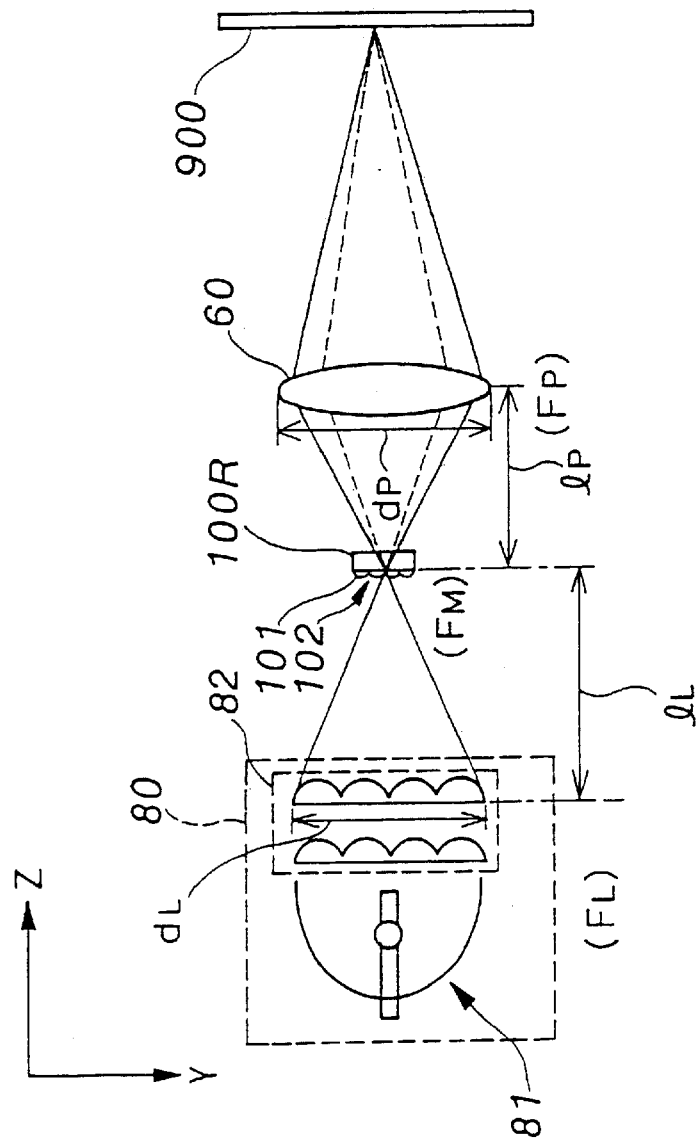
FIG. 2 is a schematic structural view of an equivalent optical system for a red light beam.

Next, a description will be given of the relationship between the f-number of the illumination optical system 80 and the f-number of the projection optical system 60. Although the optical paths leading from the illumination optical system 80 to the screen 900 via the liquid crystal light valves 100R, 100G, and 100B and the projection optical system 60 are bent in order to contain the optical system in a compact space and for other reasons, they are, in optical terms, practically equivalent to those of an optical system in which lenses are linearly arranged along the light-source optical axis. FIG. 2 shows an equivalent optical system for a red beam, from which the color separation optical system 925, the light-collecting lens 951, and the dichroic prism 10 described above are left out. Furthermore, equivalent optical systems for a green beam and a blue beam are similar, and therefore, descriptions thereof are omitted.

As shown in FIG. 2, the liquid crystal light valve 100R is provided, on its light incident side, with a microlens array 102 composed of a plurality of microlenses 101 in order to prevent light utilization efficiency from being deteriorated due to the increase in definition. The microlenses 101 are formed corresponding to pixel apertures, and given optical properties such as to collect light incident on the liquid crystal light valve 100R to the corresponding pixel apertures.

Therefore, in the projection display device 1 of this embodiment, emergent light from the liquid crystal light valve 100R is diffused by the action of the microlenses 101, as shown by solid lines in FIG. 2. For this reason, the emergent light from the liquid crystal light valve 100R spreads wider than emergent light (shown by broken lines in FIG. 2) from a liquid crystal light valve in a projection display device having a conventional configuration.

In the projection display device 1 of this embodiment, the f-number $F_P$ of the projection optical system 60 is set to be less than the f-number $F_L$ of the illumination optical system so that emergent light from the liquid crystal light valve 100R, which is diffused by the microlenses 101, is efficiently drawn into the projection optical system 60.

Although the projection optical system 60A is, in general, frequently represented by a single lens element in most cases, as shown in FIG. 2, it is composed of a plurality of lens elements in normal cases. This means that a plurality of lens elements can be replaced by a single lens element having a function equivalent to that of those lens elements. It is assumed that the f-number $F_P$ of the projection optical system refers to the f-number of the single lens element thus replaced, that is to say, a value $1_P/d_P$ that is obtained by dividing a focal distance $1_P$ of the single lens element by a diameter $d_P$ of the lens.

Furthermore, the f-number $F_L$ of the illumination optical system refers to the f-number of a lens element that is disposed on the most downstream side of the optical path, that is, closest to the liquid crystal light valves 100R, 100G, and 100B, among a plurality of lens elements included in the illumination optical system. In the case in which the lens element disposed on the most downstream side of the optical path is a lens array consisting of a plurality of lenses, as in this embodiment, the f-number $F_L$ does not refers to the f-number of each lens, but to a value $1_L/d_L$ obtained by dividing a distance $1_L$ from the lens array to an object to be illuminated by the maximum diameter $d_L$ of the lens array (e.g., the diameter in the case of a circular lens array, the length of the diagonal line in the case of a rectangular lens array). Therefore, in the case of the projection display device 1 of this embodiment, the f-number $F_L$ of the illumination optical system is the f-number of the second lens plate 822, that is, a value $1_L/d_L$ obtained by dividing a distance $1_L$ from the lens plate 822 to the liquid crystal light valve 100R by the maximum diameter $d_L$ of the lens plate 822 (e.g., the diameter in the case of a circular lens plate, the length of the diagonal line in the case of a rectangular lens plate).

In the projection display device 1 using the dichroic prism 10 of this embodiment, a certain liquid crystal light valve 100B among the liquid crystal light valves 100R, 100G, and 100B, which are objects to be illuminated, is frequently positioned farther from the illumination optical system 80 than the other liquid crystal light valves. It is assumed, in such a case, that the distance $1_L$ from the lens array to an object to be illuminated means the distance to the object to be illuminated, which is nearer positioned. In particular, when the light guide system 927 is used as in this embodiment, the light-collecting lens 954, which is disposed at nearly the same position as those of the liquid crystal light valves 100R and 100G, may be regarded as an object to be illuminated.

The entire optical system for radiating light onto the liquid crystal light valves 100R, 100G, and 100B serving as illumination areas, that is, the optical path to the liquid crystal light valves 100R, 100G, and 100B, and the optical system existing on the optical path can be called an illumination optical system in a broad sense. For example, the color separation optical system 924, the light guide system 927, the light-collecting lens 951 and 952, and the like shown in FIG. 1 are included in the illumination optical system in a broad sense. The illumination optical system 80 in a narrow sense, however, mainly serves to radiate light onto the liquid crystal light valves 100R, 100G, and 100B. The present invention covers such an illumination optical system 80 in a narrow sense.

In order for almost all emergent light from the liquid crystal light valve 100R, which has been diffused by the microlenses 101, to be drawn into the projection optical system 60, the f-number $F_P$ of the projection optical system 60, the f-number $F_L$ of the illumination optical system, and the f-number $F_M$ of the microlens 101 provided in the liquid crystal light valve 10OR have the following relationship in this embodiment. The f-number $F_M$ of the microlens 101 refers to a value obtained by dividing the focal distance of each microlens 101 by the diameter thereof.

Figure 3:
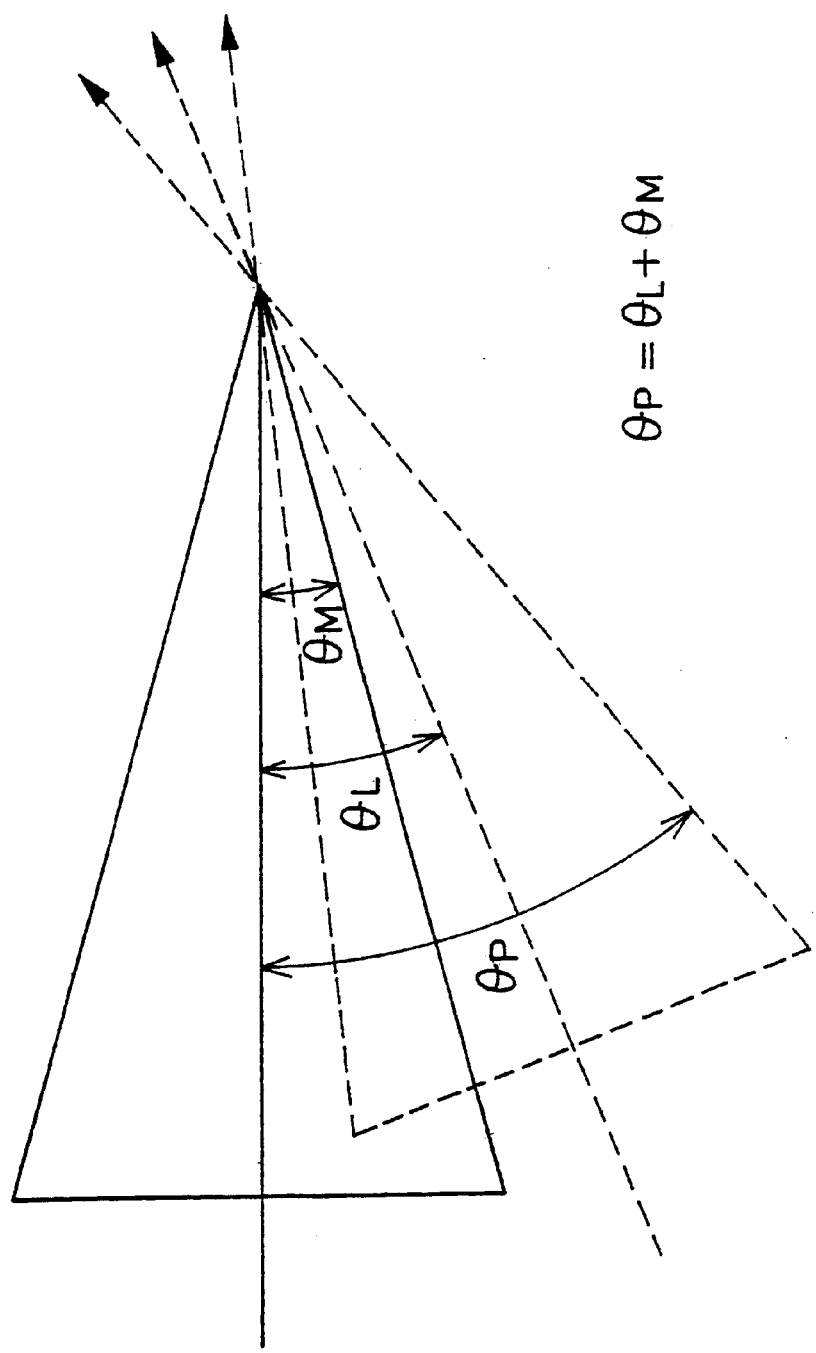
FIG. 3 is a view explaining the f-number of a projection optical system.

FIG. 3 shows the relationship among the f-numbers of the illumination optical system 80, the projection optical system 60, and the microlens 101. As this figure shows, a beam angle $\theta_L$ of the illumination optical system 80 and a beam angle $\theta_M$ of the microlens 101 are obtained from the following equations (1) and (2):

$$\theta_L = 90° - \tan^{-1}(2 \times F_L) \quad (1)$$

$$\theta_M = 90° - \tan^{-1}(2 \times F_M) \quad (2)$$

A light beam guided to the projection optical system 80 is a diffused beam from the illumination optical system 60 that is also diffused by the microlens 101. For this reason, an angle $\theta_P$ of the light beam guided to the projection optical system 60 is the sum of the beam angle $\theta_L$ of the illumination optical system 80 and the beam angle $\theta_M$ of the microlens 101, and is obtained from the following equation (3):

$$\theta_P = \theta_L + \theta_M \quad (3)$$
$$= 180° - \tan^{-1}(2 \times F_L) - \tan^{-1}(2 \times F_M)$$

In this embodiment, the f-number of the projection optical system 60 is set to satisfy the equation (4) by increasing the entrance pupil of the projection optical system 60 so that all light beams having the angle $\theta_P$ are drawn into the projection optical system 60.

$$F_P \leq \{\tan(90° - \theta_P)\}/2 \quad (4)$$

That is to say, according to the equations (3) and (4), the f-number $F_P$ of the projection optical system, the f-number $F_L$ of the illumination optical system, and the f-number $F_M$ of the microlens in the projection display device of this embodiment, are set to satisfy the equation (5):

$$F_P \leq [\tan\{\tan^{-1}(2 \times F_M) + \tan^{-1}(2 \times F_L) - 90°\}]/2 \quad (5)$$

Therefore, for example, when the f-number $F_L$ of the illumination optical system 80 is 2.5 and the f-number $F_M$ of the microlens 101 is 3.5, the f-number $F_P$ of the projection optical system 60 is set to be less than approximately 1.4. When the f-number $F_L$ of the illumination optical system 80 is 5.0 and the f-number $F_M$ of the microlens 101 is 3.5, the f-number $F_P$ of the projection optical system 60 is set to be less than approximately 2.0.

In this way, the f-number $F_P$ of the projection optical system 60 is specified in the projection display device 1 of this embodiment so that emergent light from the liquid crystal light valves 100R, 100G, and 100B diffused by the microlenses 101 is efficiently drawn into the projection optical system. For this reason, it is possible to avoid a situation in which a part of emergent light from the liquid crystal light valves 100P, 100G, and 100B with microlenses misses the projection optical system 60, and to thereby prevent light utilization efficiency from being lowered due to diffusion by the microlenses 101. That is to say, it is possible to cause a large amount of light guided to the pixel apertures by the microlenses 101 to efficiently reach the projection plane, and to obtain a bright projection image in a projection display device that includes liquid crystal light valves having microlenses.

B. Modifications of Illumination Optical System

The above-described illumination optical system 80 may be replaced by illumination optical systems 80A to 80D shown in FIG. 4(a), FIG. 4(b), FIG. 5(a), and FIG. 5(b). In FIGS. 4(a) to 5(b), similar constituents to those in the illumination optical system 80 are given the same numerals, and a detailed description thereof is omitted.

Figure 4A:
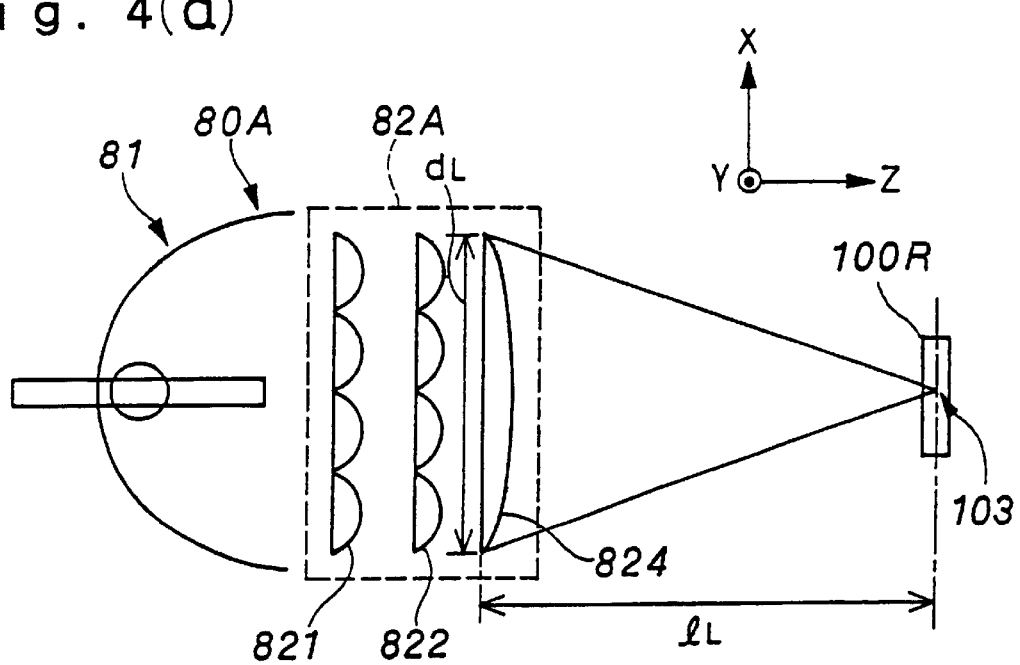
FIG. 4(a), FIG. 4(b), FIG. 5(a), and FIG. 5(b) are views showing modifications of an illumination optical system.

The illumination optical system 80A shown in FIG. 4(a) comprises a uniform illumination optical system 82A including two lens plates 821 and 822 and a superimposing lens 824, and a light source 81. While intermediate beams split by the first lens plate 821 are superimposed on the liquid crystal light valves 100R, 100G, and 100B by the second lens plate 822 in the above-described illumination optical system 80A, they are superimposed via the superimposing lens 824 in this modification. In this modification, the f-number $F_L$ of the illumination optical system means the f-number of the superimposing lens 824 that is disposed on the most downstream side of the optical path.

Figure 4B:
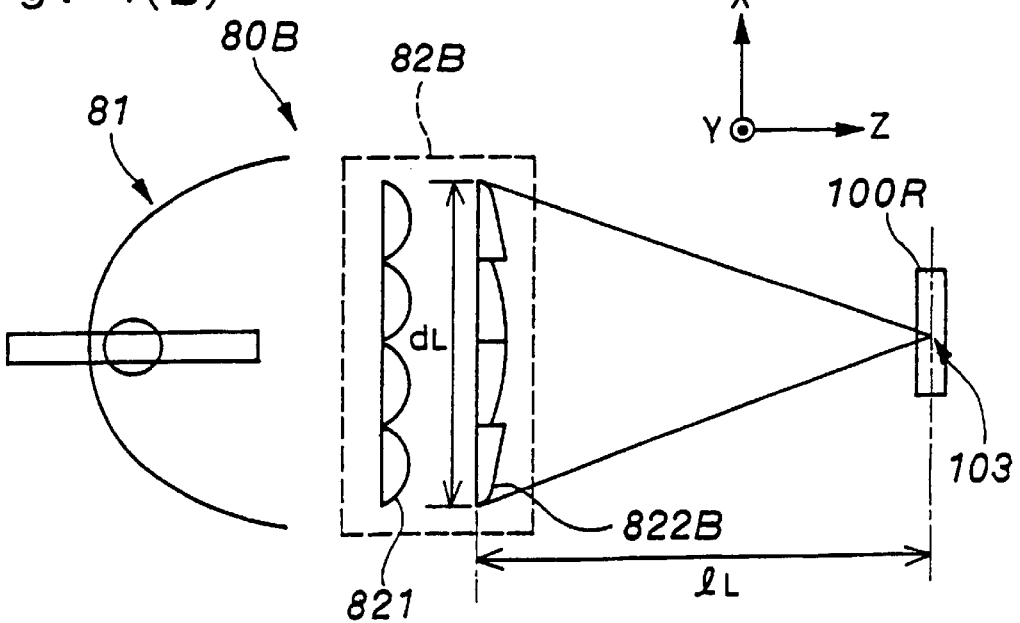

In the illumination optical system 80B shown in FIG. 4(b), a section constituted by the second lens plate 822 and the superimposing lens 824 in FIG. 4(a) is replaced by a single decentering lens plate 822B having the same functions as those of both the elements. In this modification, the f-number $F_L$ of the illumination optical system is represented by a value $1_L/d_L$ obtained by dividing a distance $1_L$ from the lens plate 822B, which is disposed on the most downstream side of the optical path, to an object to be illuminated by the maximum diameter $d_L$ of the lens plate 822B (e.g., the diameter in the case of a circular lens plate, the length of the diagonal line in the case of a rectangular lens plate).

Figure 5A:
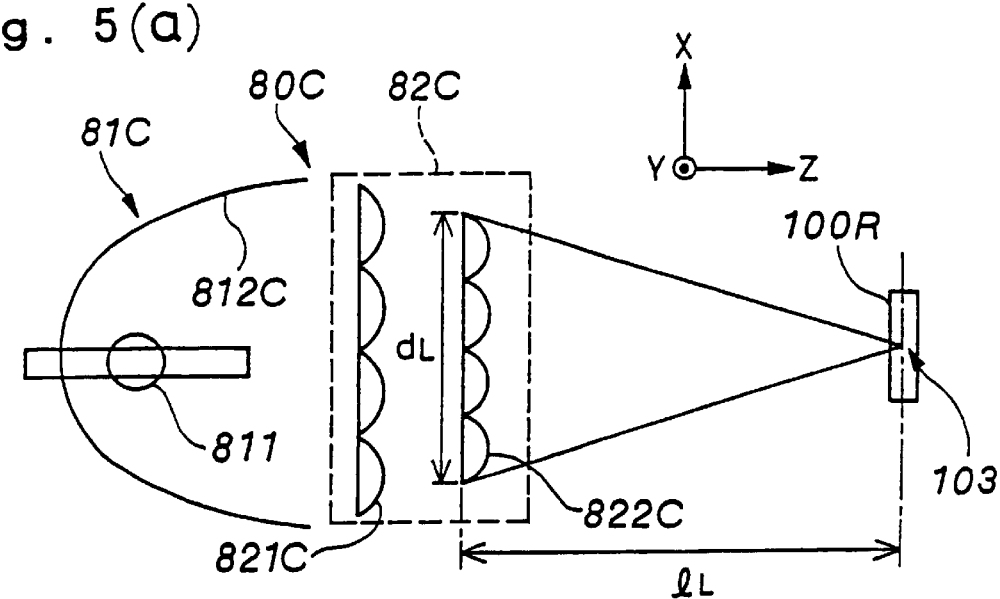

The illumination optical system 80C shown in FIG. 5(a) comprises a uniform illumination optical system 82C including two lens plates 822C, and a light source 81C. The light source 81C includes a light-source lamp 811 and an elliptic reflector 812C. The light source 81C in this modification emits convergent light, as distinct from the above-described light source 81 that emits parallel light. The lens plates 821C and 822C that constitute the uniform illumination optical system 82C are shaped in accordance with the width of convergent light emitted from the light source 81C. The functions of the lens plates 821C and 822C are similar to those of the lens plates 821 and 822 in the illumination optical system 80. In this modification, the f-number $F_L$ of the illumination optical system is represented by a value $1_L/d_L$ obtained by dividing a distance $1_L$ from the lens plate 822C, which is disposed on the most downstream side of the optical path, to an object to be illuminated by the maximum diameter $d_L$ of the lens plate 822 (e.g., the diameter in the case of a circular lens plate, the length of the diagonal line in the case of a rectangular lens plate).

Figure 5B:
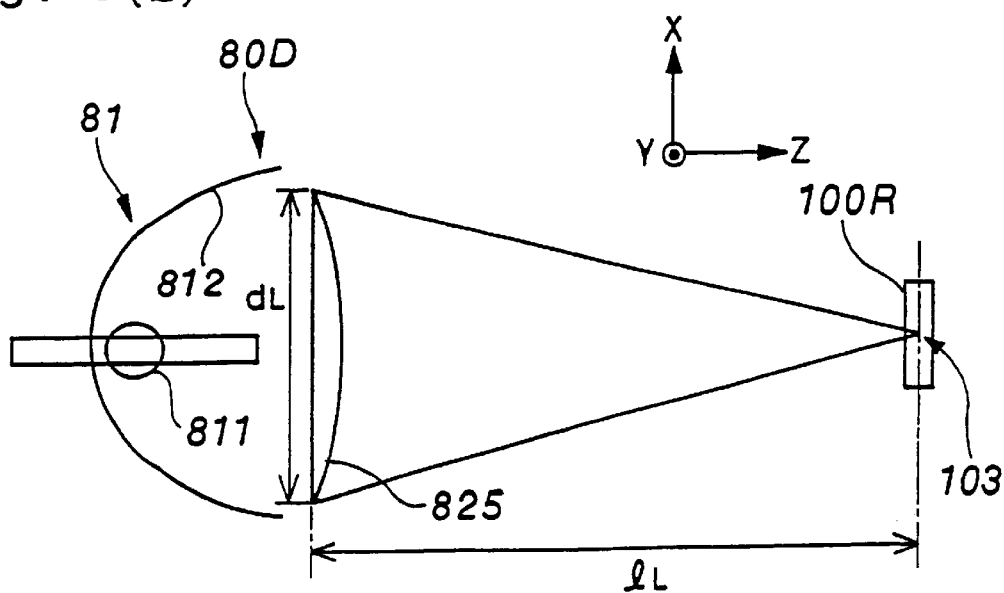
Figure 6:
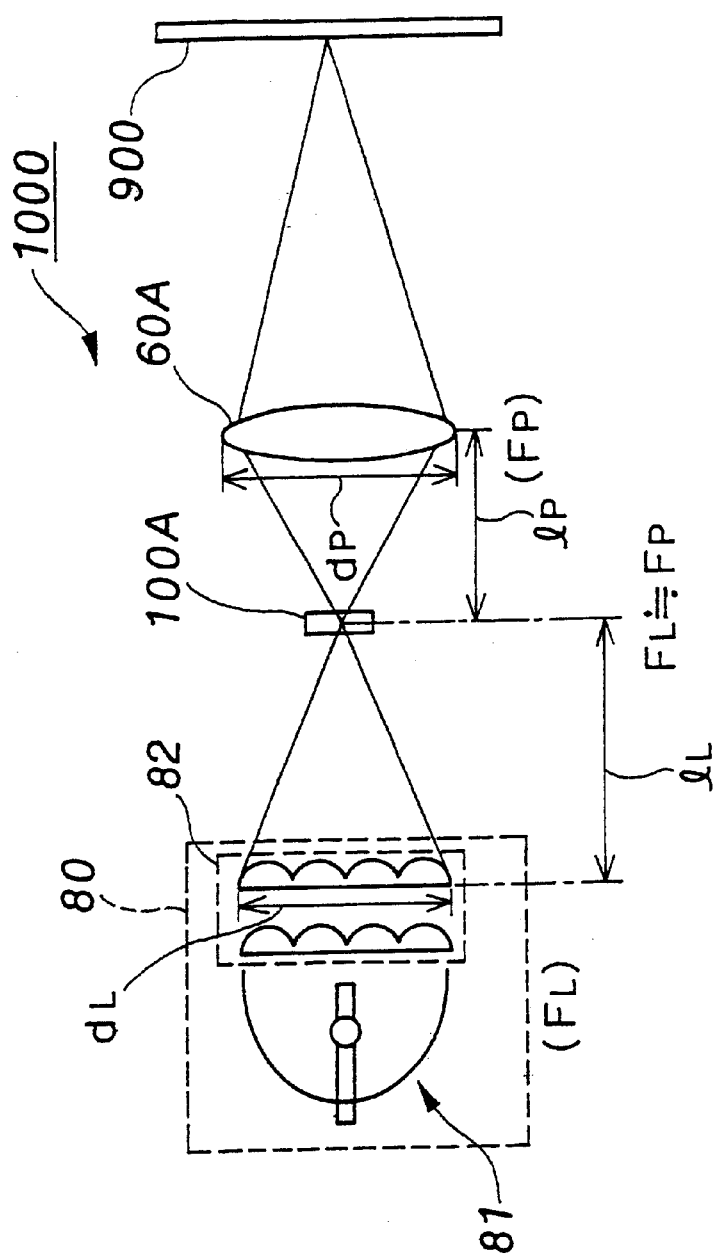
FIG. 6 is a schematic structural view of an optical system in a conventional projection display device.

The illumination optical system 80D shown in FIG. 5(b) comprises a light source 81, and a light-collecting lens 825. The light-collecting lens 825 serves to prevent light emitted from the light source 81 from diffusing. In this modification, the f-number $F_L$ of the illumination optical system means the f-number of the light-collecting lens 825 that is disposed on the most downstream side of the optical path.

C. Other Embodiments

While the above-described projection display device 1 is a front projection display device that performs projection from the side where a projection plane is observed, the present invention may also be applied to a rear projection display device that performs projection from the side opposite to the side where a projection plane is observed.

What is claimed is:

1. A projector, comprising:
   a light valve that modulates a light beam emitted from an illumination optical system, said light valve including a plurality of pixels arranged in a matrix;
   a microlens array having a plurality of microlenses that collect incident light to said pixels; and
   a projection optical system that enlarges and projects the light beam modulated by said light valve, wherein the following equation is satisfied:

$$F_P \leq [\tan\{\tan^{-1}(2 \times F_M) + \tan^{-1}(2 \times F_L) - 90°\}]/2$$

where $F_P$ is an f-number of said projection optical system, $F_L$ is an f-number of said illumination optical system, and $F_M$ is an f-number of said microlenses.

2. The projector according to claim 1, said illumination optical system including a light source, and a uniform illumination optical system that splits a light beam emitted from said light source into a plurality of partial beams, and superimposes the partial beams onto said light valve.

3. The projector according to claim 1, said illumination optical system including a light source, a first lens plate having a plurality of rectangular lenses that split light emerging from said light source into a plurality of intermediate beams, and a second lens plate having a plurality of rectangular lenses that superimposes the plurality of intermediate beams split by said first lens plate onto said light valve.

4. The projector according to claim 3, said plurality of rectangular lenses comprising decentering lenses.

5. The projector according to claim 1, said illumination optical system including a light source, first and second lens plates having a plurality of rectangular lenses that split light emerging from said light source into a plurality of intermediate beams, and a superimposing lens that superimposes the plurality of intermediate beams split by said first and second lens plates onto said light valve.

6. The projector according to claim 1, said illumination optical system including a light source, and a light-collecting lens that collects light emerging from said light source.

7. The projector according to claim 1, further comprising a color separation optical system that separates a light beam emitted from said illumination optical system into a plurality of color beams, a plurality of said light valves that modulates the color beams separated by said color separation optical system, a color synthesizing optical system that synthesizes the color beams modulated by said light valves, and said projection optical system that enlarges and projects the beams synthesized by said color synthesizing optical system.

8. A method of forming a projector, comprising:
   providing a light valve that modulates a light beam emitted from an illumination optical system, said light valve including a plurality of pixels arranged in a matrix;
   providing a microlens array having a plurality of microlenses that collect incident light to said pixels; and
   providing a projection optical system that enlarges and projects the light beam modulated by said light valve, wherein the following equation is satisfied:

$$F_P \leq [\tan\{\tan^{-1}(2 \times F_M) + \tan^{-1}(2 \times F_L) - 90°\}]/2$$

where $F_P$ is an f-number of said projection optical system, $F_L$ is an f-number of said illumination optical system, and $F_M$ is an f-number of said microlenses.

9. The method of forming a projector of claim 8, said illumination optical system including a light source, and a uniform illumination optical system that splits a light beam emitted from said light source into a plurality of partial beams, and superimposes the partial beams onto said light valve.

10. The method of forming a projector of claim 8, said illumination optical system including a light source, a first lens plate having a plurality of rectangular lenses that split light emerging from said light source into a plurality of intermediate beams, and a second lens plate having a plurality of rectangular lenses that superimposes the plurality of intermediate beams split by said first lens plate onto said light valve.

11. The method of forming a projector of claim 10, said plurality of rectangular lenses comprising decentering lenses.

12. The method of forming a projector of claim 8, said illumination optical system including a light source, first and second lens plates having a plurality of rectangular lenses that split light emerging from said light source into a plurality of intermediate beams, and a superimposing lens that superimposes the plurality of intermediate beams split by said first and second lens plates onto said light valve.

13. The method of forming a projector of claim 8, said illumination optical system including a light source, and a light-collecting that collects light emerging from said light source.

14. The method of forming a projector of claim 8, further comprising:
   providing a color separation optical system that separates a light beam emitted from said illumination optical system into a plurality of color beams, a plurality of said light valves that modulate the color beams separated by said color separation optical system, a color synthesizing optical system that synthesizes the color beams modulated by said light valves, and said projection optical system that enlarges and projects the beams synthesized by said color synthesizing optical system.

* * * * *